March 4, 1924.

H. M. EDMUNDS 1,485,493

PROCESS OF PRODUCING GIVEN THREE DIMENSIONAL FIGURES AND MEANS FOR CARRYING OUT THE SAID PROCESS

Filed July 3, 1920

Howard M. Edmunds Inventor

By Attorney

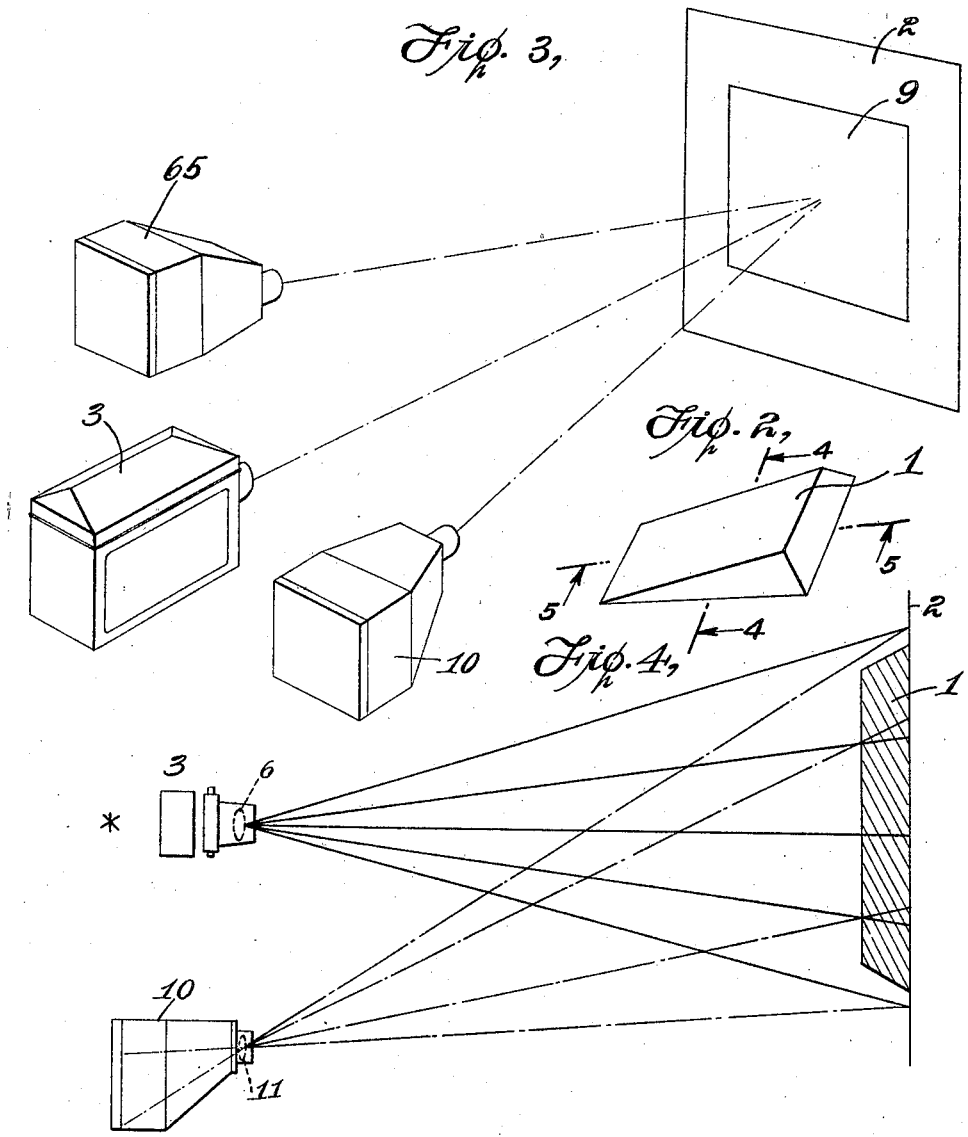

March 4, 1924.
H. M. EDMUNDS
1,485,493
PROCESS OF PRODUCING GIVEN THREE DIMENSIONAL FIGURES AND MEANS FOR
CARRYING OUT THE SAID PROCESS
Filed July 3, 1920
8 Sheets-Sheet 3
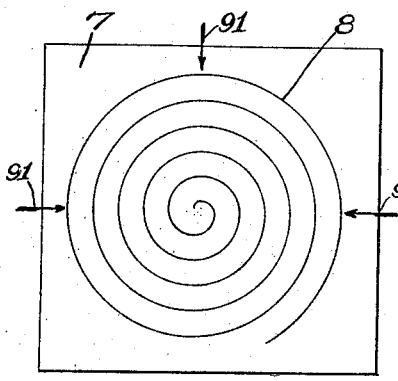
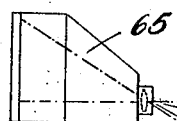
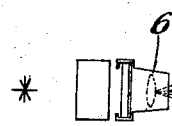
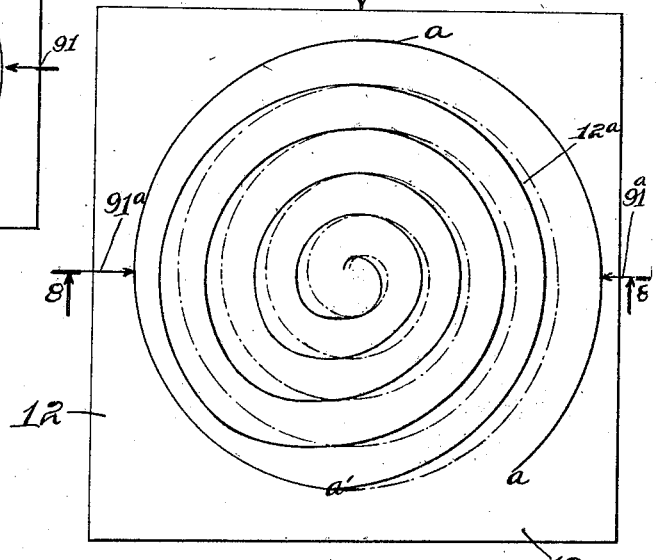
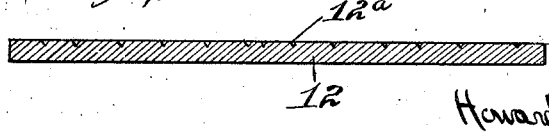

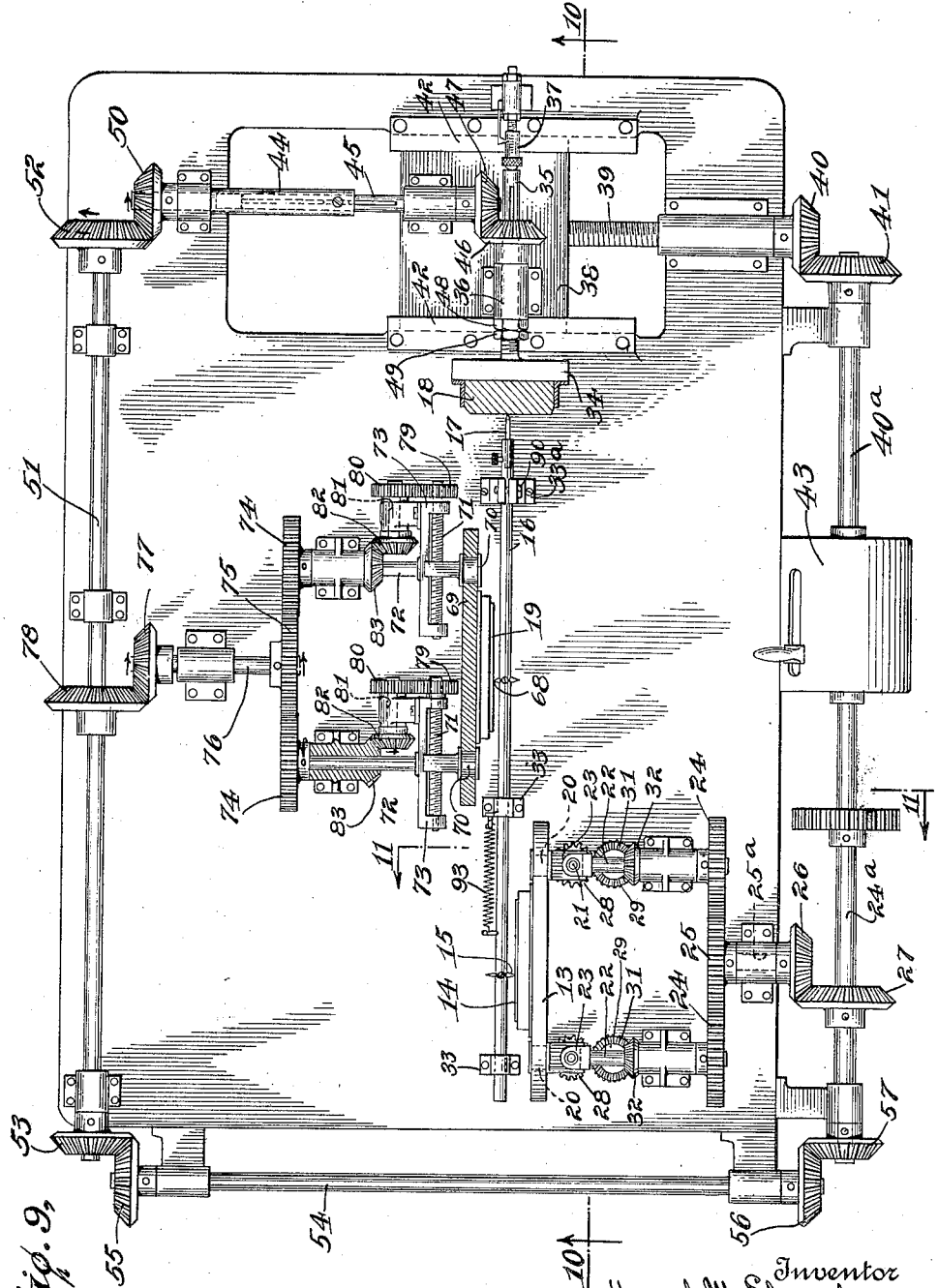

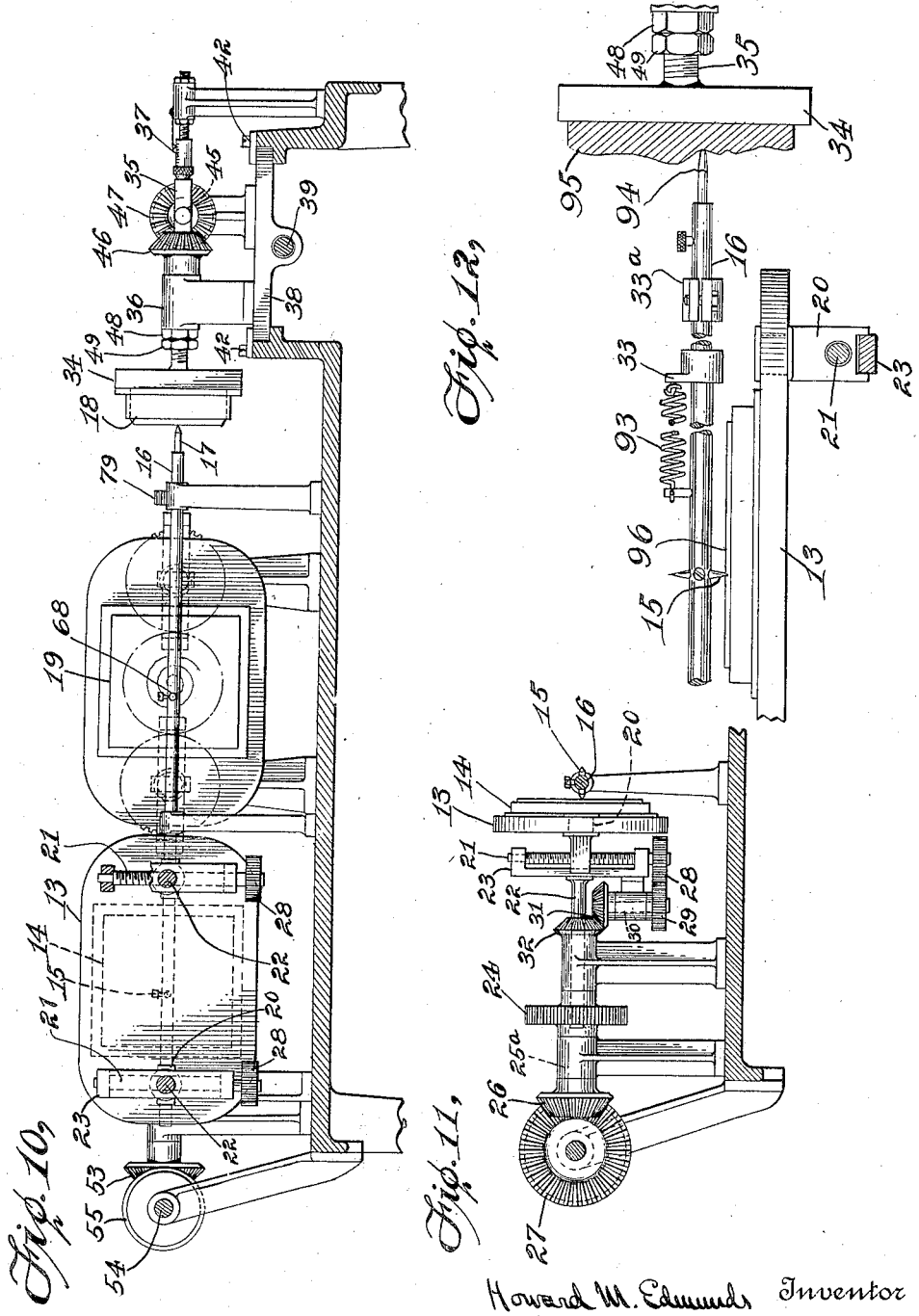

March 4, 1924.　　　　　　　　　　　　　　　　　　　　1,485,493
H. M. EDMUNDS
PROCESS OF PRODUCING GIVEN THREE DIMENSIONAL FIGURES AND MEANS FOR
CARRYING OUT THE SAID PROCESS
Filed July 3, 1920　　　　　　　　8 Sheets-Sheet 6
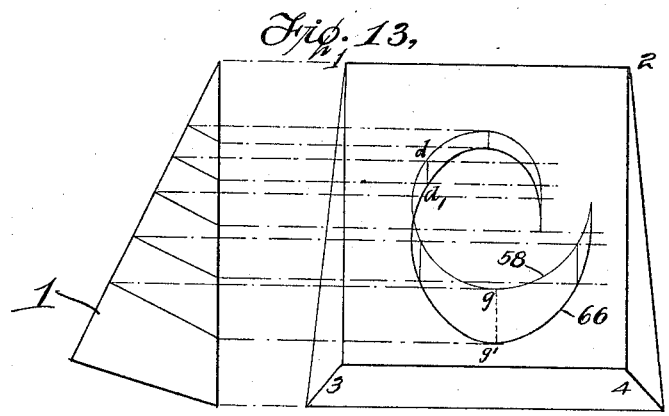
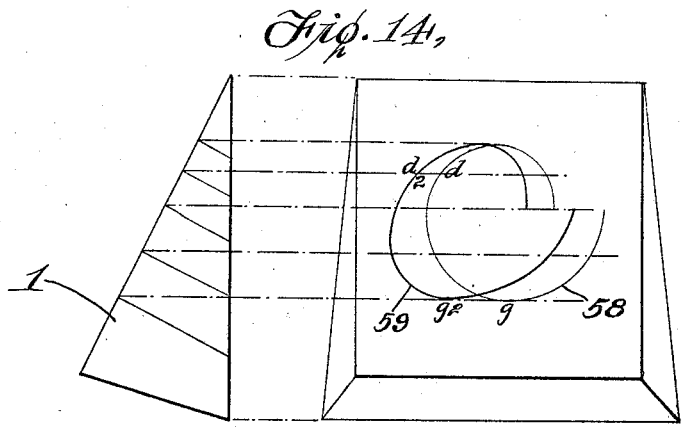
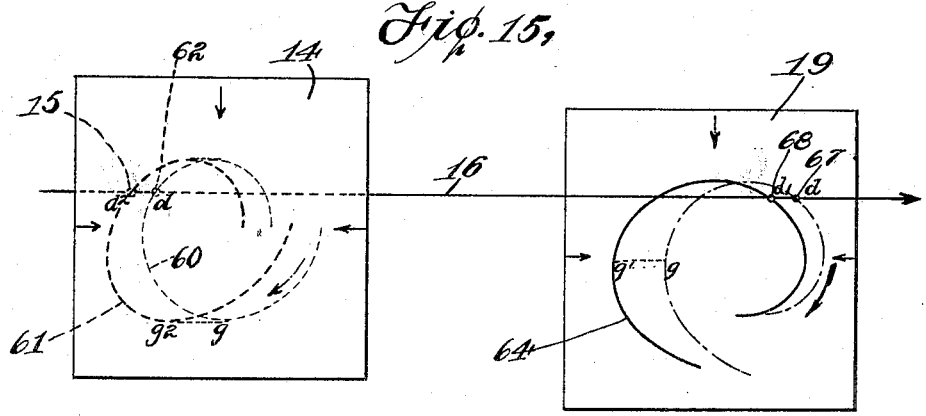

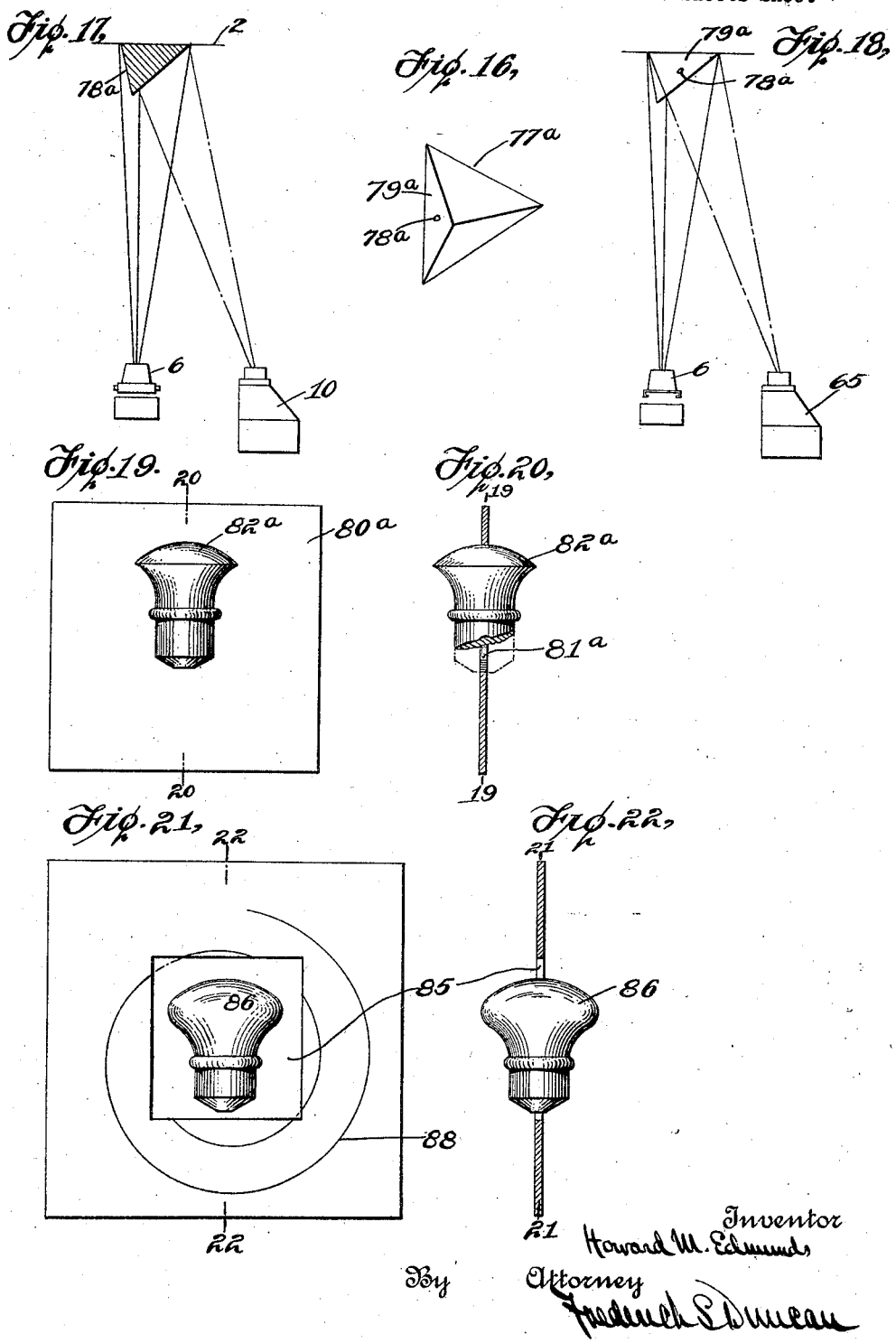

March 4, 1924.

H. M. EDMUNDS

PROCESS OF PRODUCING GIVEN THREE DIMENSIONAL FIGURES AND MEANS FOR CARRYING OUT THE SAID PROCESS

Filed July 3, 1920

Howard M. Edmunds Inventor

By Attorney Frederick S. Duncan

Patented Mar. 4, 1924.

1,485,493

UNITED STATES PATENT OFFICE.

HOWARD M. EDMUNDS, OF BRIGHTON, ENGLAND.

PROCESS OF PRODUCING GIVEN THREE-DIMENSIONAL FIGURES AND MEANS FOR CARRYING OUT THE SAID PROCESS.

Application filed July 3, 1920. Serial No. 393,962.

*To all whom it may concern:*

Be it known that I, HOWARD M. EDMUNDS, a subject of the King of Great Britain and Ireland, residing at Brighton, England, have invented certain new and useful Improvements in Processes of Producing Given Three-Dimensional Figures and Means for Carrying Out the Said Processes, of which the following, taken in connection with the accompanying drawings, is a specification.

One object of my invention is to provide a means and method of producing or reproducing three dimensional figures either in relief or intaglio as desired. The production or reproduction may be either in full or partial relief or intaglio and to true or altered scale.

Another object is the production of a plane surface on which is defined a line or lines defining the contour of a three dimensional figure with reference to a given base line or lines, and from which may be constructed a guide plate suitable for use in a machine whereby the reproduction of the surface of the figure may be accomplished.

Another object is the production of a guide plate on which is defined a lineal guiding element preferably in the form of a groove or grooves defining the contour of a three dimensional figure with reference to a given base line or lines on said guide plate, the location of which thereon is known or ascertainable, whereby the guide plate may be used in a machine for the reproduction of the surface of the figure. Another object is to provide a method or process for utilizing said guide plate in the production of a three dimensional figure recorded thereon.

Another object is the construction of a machine for carrying out the last mentioned method.

Another object is to provide an apparatus for carrying out the process of making said guide plate.

Referring to the drawings:

Figure 2 is a perspective view of an object selected at random to illustrate the practice of my invention.

Figure 3 is a perspective view of the units of my apparatus assembled in suitable relation for taking a photograph from which a guide plate may be made.

Figure 4 is a plan view on the line 4—4 of Figure 3, showing in addition the object shown in Figure 2 on the line 4—4 of that figure, the object being placed against the screen.

Figure 5 is a view in elevation on the line 5—5 of Figure 3 showing in addition the object shown in Figure 2 on the line 5—5 of that figure, the object being placed against the screen.

Figure 6 is a view of a transparency such as is used in the optical projector, showing the image of a spiral thereon, the number of convolutions of the spiral per unit of radius being much reduced from the number that would be used in practice.

Figure 7 is a view of a guide plate such as is used in my machine for reproducing the three dimensional figure, showing thereon in dotted lines, the position of the guide plate base spiral and the displaced spiral, the number of convolutions of the spiral shown being much reduced as in the case of transparency shown in Figure 6 from the number that would be used in practice.

Fig. 8 is a sectional view of Figure 7 on the line 8—8 of the latter.

Figure 9 is a plan view of my machine for reproducing the three dimensional figure from the guide plate.

Figure 10 is a vertical section of my machine on the line 10—10 of Figure 9.

Figure 11 is a detached vertical section on the line 11—11 of Figure 9.

Figure 12 is a detached view of a modification of my apparatus as adapted for making a guide plate directly from a three dimensional figure without the employment of intermediate process.

Figure 13 is a combined side elevation and plan view of an object showing the position of a single convolution of a base spiral thereon and also position of the displaced spiral as it appears displaced in a downward direction.

Figure 14 is a combined side elevation and plan view of an object showing the position of a single convolution of a base spiral thereon and also the position of the displaced spiral as it appears displaced in a sidewise direction.

Figure 15 is a diagrammatic view illustrating the manner in which two complementary guide plates, on which are recorded the displaced spirals of Figures 13 and 14, are adjusted in my machine and the manner in which they function in coordination with each other.

Figure 16 is a plan view of an object selected with a view to illustrating my process as applied to the reproduction of three dimensional figures so shaped that part of the surface cannot be registered on a single camera.

Figure 17 is a plan view and Figure 18 is a view in elevation of my apparatus showing the method in which a combination of two cameras may be utilized to photograph the entire relief surface of the object illustrated in Figure 16.

Figure 19 is a front elevation of a screen showing the manner in which an object is placed with reference to the screen so that a portion of the object may be reproduced against a plane of relief passing through the object.

Figure 20 is a sectional view of Figure 19 on the lines 20—20 of the latter.

Figure 21 is a front elevation of a screen illustrating a modification in structure from that of Figure 20.

Figure 22 is a section of Figure 21 on the line 22—22 of the latter.

If by means of a transparency placed in the usual manner in an optical projector provided with a lens having a flat field of focus an image of a line be thrown on an object in relief against a screen, each point in the line so thrown may be considered as having been displaced from the position on the screen which it would have occupied had not the object been interposed between the projector lens and the screen, the measure of actual displacement being the distance from the point on the surface of the object to the point on the screen from which it is considered as having been displaced. It follows, therefore, that the entire line may be considered as having been displaced from the position which it would have occupied on the screen were not the object interposed. For the purpose of explanation it is convenient to term any point of a line or the line itself thrown on the object a "contour point" or "contour line" as the case may be, and to term a point or line when considered as occupying or when actually occupying a position on the screen a "base point" or "base line" as the case may be. The base point or base line which occupies the position from which a particular contour point or line has been displaced may be termed the "corresponding base point" or "corresponding base line" of the latter, and vice versa.

Figure 1:
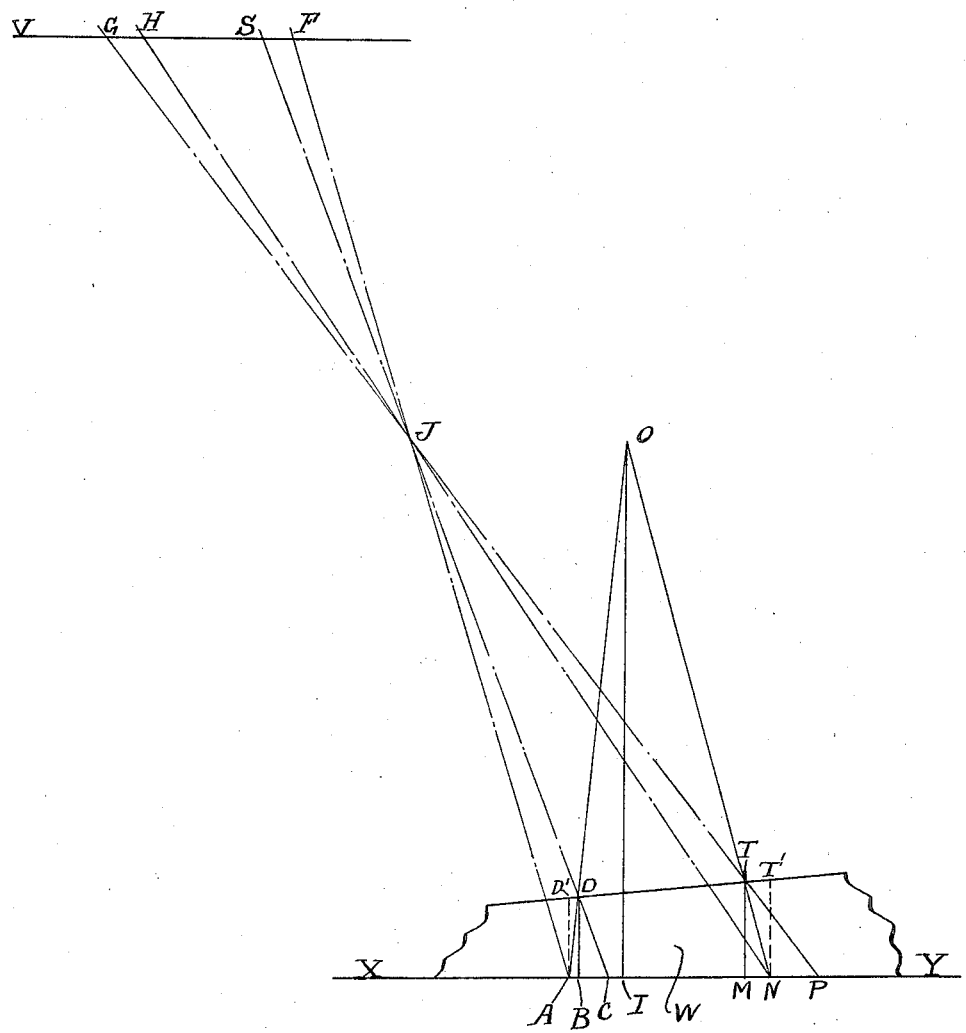
Figure 1 is a geometrical diagram showing the disposition of units of my apparatus for making the guide plate, the distances being much exaggerated from those of actual practice for the sake of clearness.

For further explanation reference may be had to Figure 1, which is a diagram designed to make clear the foregoing principles and certain other principles involved in the practice of my invention. In this diagram X Y represents a vertically positioned screen in plan view and W indicates a horizontal section of an irregularly shaped object in relief against the screen. At O is located the emergent nodal point of the lens of an optical projector, the optical axis thereof being preferably in a normal O I to the screen. At J, in a line passing through the emergent nodal point of the projector lens and parallel with the screen, is located the incident nodal point of the lens of a camera, the optical axis of the lens being preferably parallel to that of the projector lens and in the same horizontal plane, and the sensitized plate V of the camera being parallel with the screen. In this drawing, which, as has hereinbefore been stated, is diagrammatic only, certain of the distances and angles are greatly exaggerated as compared with conditions as they would ordinarily exist in practice.

Assume that D and T are any two contour points on the surface of the object W at unequal distances from the screen. Considering the point D for example, it is obvious that its image will be registered on the camera plate at S and that, were not the object interposed, the image of A the corresponding base point, would be registered at F. Consequently, the distance A D will be the measure of actual displacement from A to D caused by the interposition of the object, and the distance S F on the camera plate will be a function of this distance. Similarly in the case of the point T, its image will be registered at G and N T will be the measure of actual displacement from N to T and G H will be a function of this distance. Subject to the condition under which I operate in actual practice, as will be hereinafter more fully explained, G H bears to N T substantially the same ratio as does S F to A D and similarly with respect to all contour points on the object and their corresponding base points. Therefore, the apparent displacement of points at unequal distances from the screen, that is, the displacement of such points as registered on the camera plate, bears a substantially constant ratio to the actual displacement, regardless of the position of the contour point on the object and regardless of the actual displacement as the latter varies with the contour of the object, provided the distance O–I is relatively great compared with the dimensions of the object. On the other hand, with the camera plate, screen, camera lens, and projector lens, arranged in the relation above described, all contour points in any given plane parallel to the screen, or, in other words, all points at an exactly equal distance from the screen, undergo an equal apparent displacement, that is, the ratio of apparent to actual displacement is a constant.

It follows from what has been said that if a line be thrown by the projector on the object, the line in its displaced position may be photographed on the camera plate and that, if the position on the camera plate of the corresponding base line be known or ascertainable as it would be registered thereon were the object not interposed between the camera and screen, I will have made a plate on which is defined a line, every point in which will be distant from a known or ascertainable point on the plate according to a ratio that is at least substantially a constant for every contour point on the surface of the object and its corresponding base point. Such a plate I propose to make and utilize in the reproduction of the surfaces of these dimensional figures, to scale if desired, and either in partial or full relief or intaglio in the manner now to be described.

For the purposes of practicing my invention, certain lines or curves or systems of markings have distinct practical advantages over others in respects which will be made hereinafter, more fully to appear. For the present I will merely state that I have found that a spiral in which the generating radius increases by a constant per angular unit of rotation is well suited to my purpose, and I will describe my invention as employing for a base line a curve of that description.

Referring to Figures 2, 3, 4 and 5, an object 1 having in this particular instance somewhat the shape of a wedge is placed against the screen 2, preferably in a somewhat central location thereon and is supported in position in any convenient manner. The optical projector 3 is placed in position with the optical axis of its lens 6 preferably in a normal to the screen passing through the object. A transparency 7 (Fig. 6) having defined thereon a spiral 8 of the description above given is placed in the usual manner in the projector, so that the spiral may be thrown on the object and the entire area of the surface which is to be reproduced be subjected to direct rays from the projector. It is desirable that the field thrown by the projector should be sufficiently large that a portion of the spiral shall be thrown also on the screen itself, thus exposing sections of the base lines directly to the plate of the camera. Such a feature will be of assistance in adjusting a photoengraving of the camera plate to a machine for reproducing the object, and under certain conditions in completing exposed portions of the base lines, which in the case of objects of certain shapes do not appear on the camera plate by reason of the interposition of parts of the object, as will be hereinafter more fully explained.

The spiral having been thrown on the object and preferably on a portion of the screen, a photograph may then be taken of the spiral, as it appears thrown on the screen and the object, by a camera 10 so located that the incident nodal point of its lens 11 is in a plane parallel with the screen and passing through the emergent nodal point of the projector lens 6. While not essential to the practice of my invention, it is also preferable that the camera be positioned so that the optical axis of its lens is parallel to that of the projector lens.

The spiral in its displaced position, or as it may be called the "displaced spiral" having been photographed with the units of the apparatus arranged as above described, it is obvious that the result will be a plate having defined thereon the displaced spiral, and that each point of the spiral as it appears photographed on the plate is displaced from the point which its corresponding base point would take on the plate, a distance which bears a ratio to the actual displacement that is substantially a constant for all points on the original. In other words, considering the screen as a base plane or plane of relief, the displaced spiral as shown on the plate defines the shape of the object along the line of the corresponding base spiral as located on the plate, the ratio of relief represented being a substantial constant for all contour points and the scale represented being a function of the relative positions of the object and the units of the apparatus when the photograph was taken. Furthermore it is obvious that all points appear to be and are displaced in directions parallel to one another.

It is convenient to term the camera image of the displaced spiral the "camera displaced spiral" and the base spiral or its locus on the plate the "camera base spiral". Of course if any other line or curve than a spiral were employed, these terms would be adapted accordingly.

The photograph having been taken and the image on the plate developed in the usual manner, I propose to use the plate as a record for the reproduction of the object in partial or full relief as may be desired. The scale of reproduction will depend upon the distance of the camera from the object. In practice, I prefer to work on a reduced scale, whether I am producing in full or partial relief.

While the image on the camera plate shows with substantial accuracy the true relation of contour points and corresponding base points, nevertheless for mechanical reasons it is preferable that the image on the camera plate be transferred to a plate that will advantageously function in a machine hereinafter to be described. Therefore for purposes of use in my machine, I transfer the image to what I term a guide plate. The guide plate may consist of a sheet, preferably of some hard substance, such as copper, on which is defined by means of a groove a reproduction of the camera displaced spiral and any portions of the camera base spiral which appear on the camera plate, and it may be produced from the camera plate by any of the well known methods of line photoengraving whereby a plate, usually of copper, is etched to conform to the lines on a design, which may be either a photographic print or negative or a drawing.

The result of the last mentioned process is a guide plate 12 (Figs. 7 and 8) having defined thereon by a groove 12$^a$ the camera displaced spiral and such portions of the camera base spiral as are registered on the camera plate.

The position on the camera plate as well as on the guide plate of the base spiral may be ascertained by throwing from the projector a field sufficiently large as indicated in Figure 4 that a portion of the spiral is thrown on the screen itself as distinguished from the object. When the photograph is taken the portion of the spiral which appears on the screen itself appears in its true relative position on the camera plate and hence is likewise reproduced in its true relative position on the guide plate as indicated by $a$—$a^1$ (Fig. 7). With a portion of the base spiral defined on the camera plate or on the guide plate, it is a simple geometrical or mathematical operation to ascertain the position of or to complete the base spiral at all points where it has not been replaced by the camera displaced spiral. Another method of locating the base spiral on the guide plate by providing the transparency with index arrows pointing to the pole of the base spiral will be hereinafter referred to. Following the system of nomenclature heretofore adopted, the base spiral or its locus on the guide plate may be termed the "guide plate base spiral" and the displaced spiral on the record may be termed the "guide plate displaced spiral".

A method of and means for reproducing the surface of the object by means of the guide plate may now be described and reference may be had to Figures 8 and 9, which show a machine, the purpose of which among other things is to impart to the table 13 supporting the guide plate 14, the proper motion to cause the needle or stylus 15, carried on the reciprocating rod 16 and adapted for relative travel with respect to and in the groove of the guide plate, to move the graver 17 in such manner as to carve the figure represented on the guide plate in relief in a block 18 of material. I have also shown my machine as adapted to employ a second record 19 which, as will be hereinafter explained, may be used under certain conditions, and I have also shown my machine adapted to cause the work to travel and rotate in coordination with the motion of the guide plate or guide plates.

Any suitable means may be adopted to cause the table 13 to move in the manner desired. One method and means which I find suitable is to mount it on two pintles, 20, 20 which are mounted on non-traversing screws 21, 21 which in turn are given a rotary motion on their longitudinal axes, and at the same time a rotary motion on their transverse axes. Referring to Figure 8, the shafts 22, 22 carry the screw mountings 23, 23 and have mounted thereon the gears 24, 24 which are turned by the gear 25, which in turn is connected to the driving shaft 24$^a$ by the shaft 25$^a$ (shown in dotted lines), the gear 26, and the gear 27. The non-traversing screws are journalled in bearings in the screw mountings and are provided with gears 28, 28 which mesh with the gears 29, 29 on the shafts 30, 30 which also carry the gears 31, 31. The gears 31, 31 mesh with the fixed gears 32, 32. It will therefore be seen that as the gear 27 rotates, the pintles travel away from or toward the axes of the shaft 25$^a$, the distance travelled per revolution of the latter being functions of the pitch of the screw and the ratios of the gears, but being equal to the increment of the radius of the guide plate base spiral.

Slidably mounted in a bearing 33 is the rod 16 provided with a needle or stylus 15 and a graver 17. The line of movement of this rod is preferably parallel to the plane of the table and consequently to the surface of a guide plate which may be laid thereon. It will therefore be obvious that if a guide plate having a base spiral equal to the spiral described by any point of the table be placed on the table in such position that the line joining the poles of both base and displaced spiral is in the line of motion in which the needle is adapted to reciprocate, and the needle be set in the groove in the guide plate the graver will be given a reciprocating motion governed by the groove. I propose to avail myself of this motion to reproduce in the material 18 the original object or whatever object is recorded on the guide plate and I will first describe the means of doing it in the exact relief indicated on a guide plate. For this purpose I provide a chuck or work-holder 34 in which may be mounted a block 18 of easily carved material, such for example as wax. The chuck 34 is mounted on a shaft 35 which in turn is slidably mounted in a sliding bearing 36, whereby the shaft 35 is adapted not only to rotate but to slide longitudinally of itself. As the graver should preferably cut only a relatively small depth into the material in one-half of a cycle of movement of the needle in the groove (by which I mean the travel of the needle from the pole of the guide plate displaced spiral to its extremity or vice versa), I make provision for accurately advancing the plane of rotation of the chuck a small distance after each half cycle which consists in providing a micrometer screw 37 which may be turned by hand and the chuck advanced any desired distance.

It is necessary that the relative travel of the graver and the work transversely of the line of motion of the rod 16 be coordinated, that is, be such that the former shall describe a spiral on the latter. This may be accomplished by mounting the bearings of the chuck shaft 35 on a carriage 38 slidable transversely of the chuck shaft and by further causing the carriage to travel by means of a non-traversing screw 39 rotated by means of the gear 40 connected with the shaft section $40^a$ by means of the gear 41. The carriage may travel in the guideways 42. The pitch of the screw 39 may be made to depend on the degree of relief in which the object is to reproduced. If the object is to be reproduced in the exact degree of relief indicated on the guide plate, the screw may have a pitch equal to the increment of the generating radius of the guide plate base spiral. If with a screw of this pitch it is desired to vary the degree of relief from that indicated on the guide plate, it may be accomplished by any suitable means such as a change speed gear 43 connecting the two shaft sections $24^a$ and $40^a$ whereby it is possible to vary the relative speeds of the two sections of the shaft within limits determined by the ratios of the change speed gear. If for instance the degree of relief on the guide plate be one-fifth of the full relief, the full relief may be reproduced by decreasing the speed of the screw 39 to one-fifth of that of the non-traversing screws 21. But under all conditions the number of convolutions turned by the chuck must be equal at all times to the number of convolutions turned by the table.

The chuck shaft is driven by a two section shaft composed of the sections 44 and 45 splined together whereby the shaft is made extensible to allow for motion of the carriage 38. The chuck shaft receives power by means of the gear 46 which meshes with the gear 47 on the shaft 45. The gear 46 is splined on the chuck shaft so that the driving connection is maintained regardless of the position of the chuck shaft longitudinally. Suitable means are provided to maintain the chuck in any desired plane of rotation, consisting of the nut 48 and lock nut 49 on the chuck shaft. Power is transmitted to the shaft 44 through the medium of the gear 50 mounted thereon, the shaft 51 provided with the gear 52 which meshes with the gear 50 and carries the gear 53, the shaft 54 provided with the gear 55, which meshes with its gear 53, and with the gear 56 which meshes with the gear 57 mounted on the drive shaft $24^a$.

For a description of the manner in which a guide plate is positioned and in which it functions in the machine, reference may be had to diagrammatic Figures 13, 14, and 15. In Figure 14 is shown the object 1 and the displacement of a spiral as it appears from the camera 10 positioned in the horizontal plane of the projector. The curve 58 indicates the position of a single convolution of the spiral as thrown by the projector and the curve 59 the displaced position of the convolution as viewed from the camera. This displaced convolution when photographed and transferred to the guide plate 14 may occupy the position shown in Figure 15, in which the curve 60 indicates the position of a single convolution of the guide plate base spiral and the curve 61 the corresponding guide plate groove. The distance $d-d_2$ of Figure 15 represents the displacement $d-d_2$ of Figure 14 and the point of oscillation of the guide plate 14 is the point 62 where the guide plate base spiral 60 intersects the line of motion of the rod 16. As the guide plate 14 is oscillated for example in the direction of the arrow (Fig. 15) the guide plate base spiral 60 travels through the fixed point 62 and the needle 15 is propelled according to the varying distances along the line of displacement from the position of the guide plate base spiral 60 to the groove 61. As the point $g$ in the guide plate base spiral 60 approaches the fixed point of oscillation 62 however, it will be observed that the needle 15 is reciprocating in a line which becomes more and more nearly in alinement with the groove 61, being at the point $g_2$ when the point $g$ coincides with the point of oscillation, and the obvious result is a tendency of the needle not to respond readily to the variations in curvature.

To remedy the last mentioned situation whenever it occurs, I propose to employ a second guide plate 19 on which is a groove 64 representing the displacement of the spiral 58 (Figure 13) as it would be registered by a camera 65 placed above the projector 3 (Fig. 3) with the axis of its lens preferably normal to the screen, and the forward optical center of its lens in a plane containing the forward optical centers of the lenses of the projector and the camera 10, the plane being parallel to the screen. The two cameras should also be equidistant from the projector. The displacement as registered from the camera 65 is, in the illustration given, (Fig. 13), at right angles to the displacement registered by the camera 10. In other words, the spiral 58 (Fig. 13) is displaced to the position indicated by the curve 66. By way of further example the point $d$ (Fig. 13) is displaced to the point $d_1$, and the point $g$ to the point $g_1$. Therefore to coordinate the motion of the plate 19 with that of the plate 14 it is obvious that not only must its lines of displacement be parallel to the lines of displacement on the plate 14, but corresponding lines of displacement must lie simultaneously in the line of motion of the rod 16. For example the line of displacement $d—d_1$ and the line of displacement $d—d_2$ must both be in the line of motion of the rod 16 at the same time, and similarly with all other lines of displacement. The consequence is that as the plate 14 oscillates with respect to the point 62, and the plate 19 oscillates with respect to the point 67, both in the direction of the arrows with the needle 68 travelling in the groove 64, and the needle 15 travelling in the groove 61, the more nearly one groove approaches alinement with the travel of its needle the more nearly the other groove approaches a travel at right angles to its needle. For instance, when the needle 15 is at the point $g_2$ on plate 14, the needle 68 is at the point $g_1$, on plate 19, and its relative travel is substantially at right angles to the line of displacement $g—g_1$.

The mechanism for oscillating the second guide plate 19 is in its essentials similar to the mechanism for operating the guide plate 14 with suitable modification to cause it to oscillate in coordination with the latter. A table 69 is mounted on two pintles 70, 70 which are mounted on non-traversing screws 71, 71, which in turn are given a rotary motion on their longitudinal axes and at the same time a rotary motion on their transverse axes. The shafts 72, 72 carry the screw mountings 73, 73 and have mounted thereon the gears 74, 74 which are in mesh with the gear 75 which is driven from the shaft 51 through the medium of the shaft 76 and the gears 77 and 78. The non-traversing screws are journalled in bearings in the screw mountings and are provided with gears 79, 79, which mesh with the gears 80, 80 on the shafts 81, 81 which also carry the gears 82, 82. The gears 82, 82 also mesh with the fixed gears 83, 83. As the shaft 76 rotates, the pintles travel toward or away from the axis of the shaft 76, in a similar manner as in the case of the mechanism for operating the table 13. Under the particular conditions adopted by me for explanation of the use of two plates the photographs are described and shown as having been taken with two cameras at an angular distance from each other with respect to the projector, of ninety degrees. This obviously requires that the respective positions of the plates be such the directions of displacement on one shall be parallel to the directions of displacement on the other, a result which is accomplished by setting the non-traversing screws of one table at right angles to the non-traversing screws of the other.

Another circumstance that frequently makes desirable the use of a plurality of guide plates arises out of the fact that in photographing lineal designs thrown on objects of certain shapes any sections of the design that are not registered on a single camera plate will appear blank thereon. To make this point clear, reference may be had to Figures 16, 17, and 18 which are diagrammatic drawings illustrating such a situation. Referring to these drawings it is obvious that when an object $77^a$ is placed against the screen, the point indicated by the numeral $78^a$ will not be registered on the plate of the camera 10 by reason of the excessive pitch of the side $79^a$ of the object (Fig. 16, 17). In this particular instance not only is this true of the point $78^a$, but it is true of the entire side $79^a$ of the object. On the other hand, as shown in Figure 18 the side $79^a$ including the point $78^a$ is wholly exposed to the camera 65 and any lineal design which traverses this face will be registered in its displaced position by the camera 65. The relative positions of cameras, projector, screen, and object indicated in Figure 3 are consequently such that the entire surface of the object $77^a$ will be registered by the combination of two cameras. There are many situations in which two cameras only would not be sufficient to register the entire surface of an object, and still other situations in which a combination of two cameras could be so disposed as to register the entire surface, but only if located at a different angle than that indicated in Figure 3. Nevertheless, I find that the arrangement of Figure 3 is adaptable for the complete photographing of most objects and that in most instances two guide plates constitute a full complement for the reproduction of an object.

It is apparent that in order to produce a guide plate that will be sufficient for the reproduction of the object photographed those portions of the displaced spiral which traverse the portions of the object which are not registered on the camera plate must be completed. One method of accomplishing this purpose is as follows:

The guide plates are photo-engraved in the manner above described showing thereon the blank spaces. They are then placed in coordinated positions in the machine and the needles properly set in the respective grooves preferably at either the poles or terminals of the spiral. The machine is then put in motion and as it operates the groove of one plate will operate its needle, the other needle acting as a cutter or graver to complete the groove in the blank spaces of the other plate. In order to make the last mentioned groove deep enough to propel a graver it is frequently necessary to pass the cutting needle over the blank space a number of times. Another method of completing a groove over a blank space may be followed. The blank space is first coated with a thin film of wax or other soft acid resisting material and placed in position on the table. The cooperating needle is adjusted so that it will describe a groove in the wax, baring the metal at the bottom of the groove. The other plate being also in position the machine is set in motion, with the result that the cutting needle cuts a groove in the wax coordinated to the completed groove. The groove traversing the blank space as defined by the groove in the wax may then be etched by acid in a well-known manner.

It frequently occurs that it is desirable to reproduce only a portion of an object, in which event a screen may be provided in which is cut an aperture of such shape that it will closely fit the object on the section which is to constitute the base thereof in the reproduction. In Figures 19 and 20, I show a screen 80$^a$ with an aperture 81$^a$ shaped to fit the object 82$^a$ on the section 19—19 of Figure 20. The camera image of the base spiral will, of course, join the camera image of the displaced spiral at the proper points and the groove in the guide plate will be continuous.

It is, however, often difficult or inconvenient to cut or otherwise form an aperture that will closely fit the object, and where such is the case, another method may be followed, in connection with the description of which reference may be had to Figures 21 and 22. The screen is provided with an aperture 85 approximating as nearly as convenient, the outline of the object 86 on the section 21—21 of Figure 22 for example which is to constitute the base in the reproduction. The object,—for example that shown in Figures 21 and 22—is placed in the aperture with the section which is to constitute the base plane coinciding with the plane of the screen as shown in Figure 22, and while supported in any convenient manner, the photograph of the spiral on the screen and object is taken. Obviously, any portions of the base spiral traversing the open space between the edges of the aperture and the object will not be registered on the camera plate. The guide plate, however may be etched showing the portions 88 of the base spiral and also the displaced spiral and the base spiral be completed by placing the guide plate on one of the tables for example 13, of the machine and slowly oscillating it against a needle fixed against movement in any convenient manner, such as by means of the clamp screw 90 which tightens the two part bearing 33 of the rod 16. At those points where the portions of the guide plate base spiral thus engraved meet the guide plate displaced spiral, the needle may if desired be lifted, and again lowered when it reaches another portion of the base spiral. To facilitate positioning the plates in the machine at right angles to each other and for locating corresponding points thereon the transparency may be provided with index arrows 91 which if prolonged would intersect at the center of the base spiral. These index markings will of course be photographed and will appear on the guide plate whereby it is possible to know the location of the pole of the guide plate base spiral, and hence to know the exact direction of displacement of the guide plate displaced spiral.

It is appropriate to note at this point that I am not to be understood as stating or implying that a complete base spiral need be actually defined by markings on the guide plate. Except as to those portions which represent the exposed portion of the ground against which the reproduction is to appear, the base spiral both on the camera plate and the guide plate is represented only by an imaginary line. It is only for the purpose of adjusting the guide plate in its proper position in the machine that at least one point in the guide plate base spiral should be known. Such a point being known and the direction of displacement of the same point being known, the guide plate may be positioned on the table of the machine with the line of displacement in the line of motion of the needle, and the needle set in the groove. In making this adjustment the position of the table with reference to the pole of the spiral which it describes must of course be considered. If the point known be the pole of the guide plate base spiral the table must be at the pole of its spiral. If the point known is any other point the table must be correspondingly advanced toward the extremity of its spiral. In practice the simplest method is to start the machine at the pole of the spiral which can be easily located by means of the index arrows 91$^a$ (Fig. 7) which are reproductions of the index markings 91 on the transparency (Fig. 6). Of course in cases where a portion of the base spiral is defined on the guide plate by reason of its having been photographed as it appeared on the screen, the pole may be located by computation and measurement or the plate and the machine may be adjusted as I have above described to start carving at some point in the portions of the base spiral defined on the guide plate. Both of these methods are however unnecessarily laborious and under all ordinary circumstances I prefer to make use of the method employing the index arrows.

By substituting a blunt point 94 (Fig. 12) for the graver a guide plate or guide plates may be made direct from an object without the employment of the photographic process. The original, that is the object to be reproduced, such as is indicated by 95, is placed in the chuck as nearly centrally thereof as possible, and the rod provided with a spring 93 attached to some fixed portion of the machine and to one of the bearings 33 as shown, which tends to maintain the blunt point against the object regardless of the changing contour of the surface thereof. If, then, a plate 96 of copper or other suitable material be placed on one of the tables and the machine operated, a guide plate will be produced by the action of the needle and it may be used in connection with the machine to reproduce the object in the same manner as the guide plate made by the photographic process.

It should be mentioned in connection with the photographic process that all contour points in the reproduction, except the point corresponding to the particular contour point of the original which lies in the axis of the projector lens, are slightly dislocated radially from their true relative position on the original. Within the limits of relative distances of projector, camera, screen, and object, one from another, within which I propose to operate in actual practice, however, this radial dislocation is negligible and the consequent distortion of the original is not apparent to the eye of an observer. The amount of this distortion is a function of the angle formed by the axis of the projector lens and the ray passing from the projector lens through the point in question. It is also a function of the actual displacement of the contour point in question. For instance any point T (Figure 1) will be produced on a line corresponding to the line T′ N and any point D will be produced on a line corresponding to the line A D′. The extent of radial distortion that is excessive obviously depends on the accuracy of reproduction required in a particular case, but to give an instance, I find that if the head of an individual is to be reproduced in one-fifth relief merely for the purpose of making a reproduction that appears to the eye of an observer to be true to scale, such a result is accomplished if the projector lens be located ten feet from the screen and the camera lens or lenses, as the case may be, located two feet from the projector lens.

Also a reproduction actually varies from the true relative proportions of the original by reason of the fact that not all contour points undergo an apparent displacement that varies with their distances from the screen according to a constant ratio. The fact is that if a contour point be considered as moving along a normal toward the screen or on a line to intersect the screen, the apparent displacement decreases at a greater rate than does the distance from the screen. However, as in the case of the radial distortion above noted, this variation or distortion is negligible within the limits in which I propose to operate, an instance of which has already been given.

Although in the preferred method of practicing my invention I position the camera so that the optical axis of its lens is normal to the screen, as shown in Figure 3, the camera may if desired be positioned so that the optical axis of its lens is oblique to the screen, the incident nodal point of the lens preferably remaining however in a line passing through the emergent nodal point of the projector lens and parallel to the screen. If the photograph be taken however with the camera in the last described position, it is necessary that the photograph be corrected before it can be used in engraving a guide plate. This correction may be made by the well known method in photography whereby a photograph taken at a given angular position of the camera with reference to surface, may by re-photographing be corrected so that it will appear to be taken from a camera positioned at any other angle desired,—in the present instance as though taken by a camera with the optical axis of its lens normal to the screen. The corrected plate then shows the displaced spiral in its true relation to the base spiral and a guide plate may be engraved from it.

In further elaboration of some of the important principles involved in the practice of my invention, attention is called to that involving the use of a screen serving as a physical plane of relief. It is obvious that the image of the displaced system of markings only, as they appear on the photographic negative, fully define the contour of the surface which is to be reproduced, this contour thus defined being considered with respect to the base system of markings, whether or not they are physically existent on the negative. For any object of given form, however, the contour in its very nature must necessarily be considered with respect to some plane of relief, be the same real or imaginary. An imaginary plane of relief may, of course, be assumed and the guideplate—whether it consists of an ordinary positive made from the negative or a grooved plate or other reproduction of the negative, or even the negative itself—may be suitably modified in proportions and adjusted to a machine which has imparted to it motion coordinated with the undistorted form of the lineal design and to which further motion is imparted in accordance with the distortion. It follows, therefore, from the foregoing explanation that the part played by the physical screen in the practical application of the invention is chiefly that of an expedient for determining the proper size of guide-plate to be used in a given machine having a fixed motion for properly positioning the guide-plate in that machine. For example, assume that a given machine is constructed for use in connection with a guide-plate produced as a result of the projection of a spiral base line, which is the illustrative example of the embodiment of my invention hereinbefore described. It is obvious that the displaced lines of the projected spiral indicate the apparent displacement of contour points with reference to some plane of relief, whether this plane of relief be imaginary or real; that is to say, for instance, in the form of an actual screen. If the plane of relief be real, as in the form of a screen, and if there be portions of the base system of markings visible thereon, they will, of course, be physically displayed on the negative. The record of these base lines show them in certain proportions. These physical base lines, of course, offer a convenient means of enlarging if necessary the negative or its reproduction to coordinate it with the motion of the machine and to position it when thus enlarged, properly in the machine. It is obvious, on the other hand, however, that, even though there are not physically present on the negative any base lines or parts of base lines, they nevertheless exist as imaginary lines, and, since the constants of the apparatus and of the machine are known the guide-plate may be enlarged to proper size on the basis of this data. Another example of an expedient for properly enlarging the guide-plate and positioning it in the machine is referred to in connection with the use of the indicating arrows. These arrows form no part of the base line, but nevertheless by virtue of their directions and distances from each other likewise serve as a convenient basis for carrying out the enlargement. Of course, it is further obvious that, in carrying out the principles now under discussion, the negative may, by properly proportioning the constants of the apparatus, be produced in the first instance of proper size in the machine, and may be positioned in the machine by trial, computation or otherwise. In considering the aspect of the invention now under discussion, it is obvious that any machine in which the guide-plate is utilized must cause the plate to traverse the locus of the base lines, and it is immaterial how the position of these base lines or their spacing or other quantities relating to them are ascertained. It is to be understood that in the description the word enlarge as applied to the preparation of the guide-plate is used in its special sense of increasing or diminishing the proportions.

Also in further elaboration of the principles involved in the practice of my invention, it should be mentioned that the guiding element on the guide-plate need not necessarily consist of a physical elevation or depression in the surface of the material of which it is composed. If it is desired that a needle, stylus or similar instrument should automatically follow the displaced spiral or such other system of markings as may be chosen by the operator as most suited to his purposes, the groove offers a convenient guiding element. In its broader aspect, however, the particular nature of the guiding element is not of special importance, for the reason that it is simply necessary that the locus of the displaced system of markings be displayed in some way, in order that a stylus or any other means controlling the graver, or cutting implement, may be conveniently caused to follow the displaced system of markings. In fact, the control of the graver, or cutting instrument, may well be secured by manual operation, the operator merely causing the graver controlling element to move back and forth on the displaced lines after the manner of an ordinary pentograph tracer, as the guide-plate is moved by the machine along the base system of markings. This may conveniently be done by employing as a tracing means a microscope provided with cross hairs. Obviously a positive or other reproduction of the negative, or even the negative itself, will serve for this purpose.

Not only may a guide plate be used for producing in relief, but it may by a slight change in the method of adjustment in the machine be made to carve in intaglio. In carving in relief it has been noted that the plate is adjusted to the table of the machine with the line of the displacement of the displaced spiral extending in a direction away from the graver. To carve in intaglio the only variation in adjustment necessary is that the line of displacement be in the direction of the graver. These statements apply equally whether one or a plurality of guide plates be used simultaneously.

A guide plate may also be made by locating on a plane surface, a series of points, each of which is displaced from a base point in an actual or assumed base line a distance determined with reference to the measured distance between the base point in a similar base line and corresponding contour point of an object. The distances so determined may be to scale, and may represent a full or partial relief. The points thus located, may be connected by a groove engraved by a hand-operated engraving tool, if desired. An adaptation of this process may be utilized in making from a map a guide plate by which may be reproduced the contour of the terrain as indicated on the map by contour lines or other data which gives the elevation of points thereon.

Figure 23:
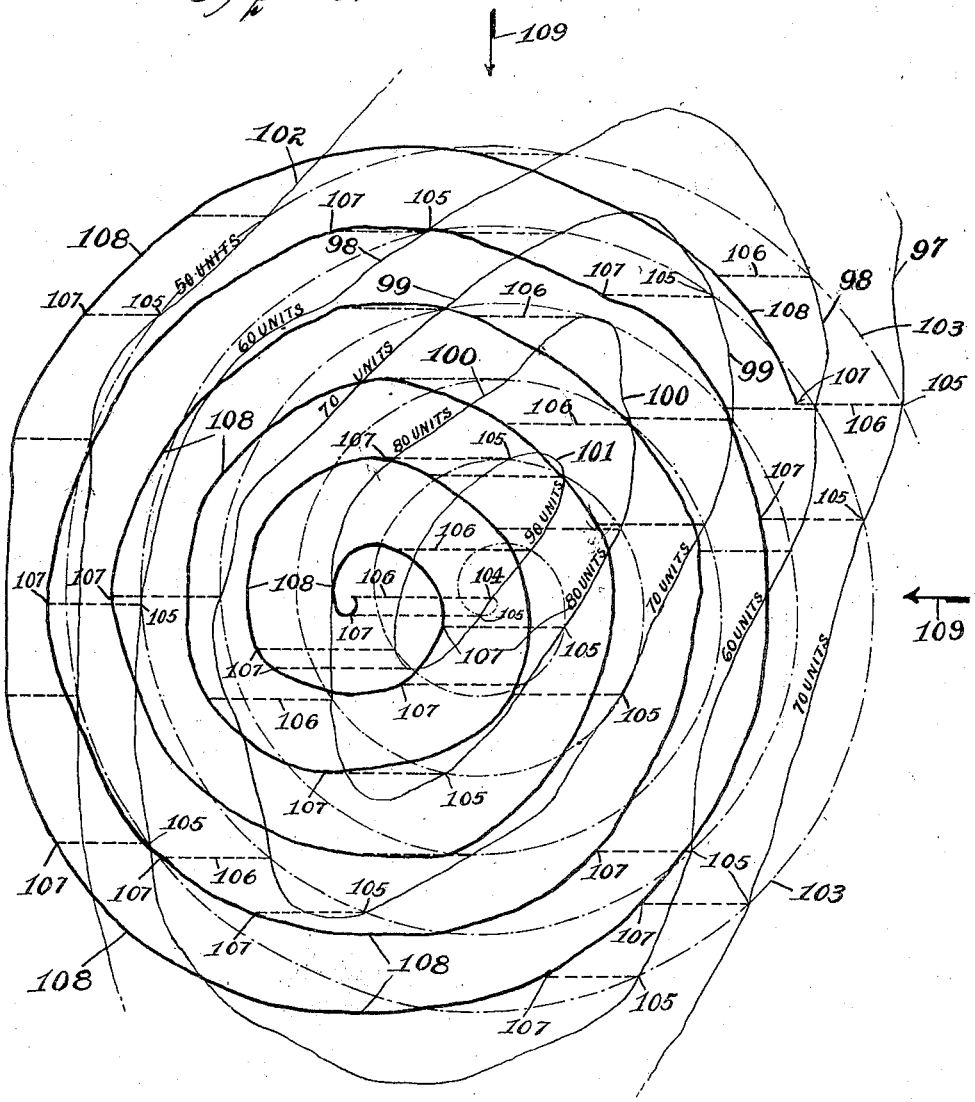
Figure 23 is a diagrammatic view illustrating the method whereby the contour of a terrain may be recorded on a guide plate by means of a contour map.

To illustrate, reference is made to Figure 23 which is a diagrammatic drawing showing contour lines 97, 98, 99, 100, 101, and 102 on a map representing elevations in the terrain of 70, 60, 70, 80, 90 and 50 units respectively.

A spiral 103 is located on the map, preferably with its pole 104 approximately centrally thereof. From the points of intersection 105 of the contour lines with the spiral distances shown by the dotted lines 106 are laid off equal to the elevations respectively indicated by the intersecting contour lines, all such distances being laid off in the same direction and parallel with each other.

The points 107 thus determined obviously determine the position of the displaced spiral and when connected by a continuous line 108 the latter constitutes the displaced spiral. The displaced spiral 108 may be then engraved in a plate of suitable material to serve as a guide plate. To avoid also engraving on the guide plate, the base spiral, the map contour lines and other markings, it is advisable to first transfer the displaced spiral to a transparent plate by tracing or otherwise from which the engraving may be done. Index lines 109 pointing to the pole of the base spiral may be shown on the map itself and reproduced on the plate to assist in determining thereon the location of the base spiral and particularly its pole, for the purpose of correctly positioning the guide plate in the machine as hereinbefore described. Of course in developing the displaced spiral on the map a base spiral is used equal to that described by the oscillating tables of the machine.

In describing the principles of my invention and the means for and method of practicing it, I have selected as objects for reproduction objects of comparatively simple design. This has been done chiefly for the reason that it is difficult to show clearly in drawings the displaced position of even a single convolution of a spiral on objects of more complicated design. It is to be understood, however, that in its practical application my invention is employed in the reproduction or production of a great variety of figures such as the head or entire figure of an individual for coins, medals, medallions and the like, objects of scientific interest, decorative panels, sculptural works, buildings, and the like.

It should also be understood that in illustrating the spiral and its displacement, I have shown a spiral of a relatively much greater increment of generating radius than would be used in practice. For most purposes in actual practice, I would employ a spiral of such proportion that on the guide plate it would have about 20 convolutions per inch radius. This number, however, would be varied according to the nature of the work to be done and the accuracy of finish required.

Having thus described my invention, I claim:

1. The process of making a guide plate for use in producing solid reproductions of objects either in full or altered scale and in full or altered degree of relief which consists in throwing by means of a light projector a line on an object in relief against a screen which is normal to the optical axis of said projector, photographing said line by means of a camera, the incident nodal point of the lens of which is in a plane normal to said optical axis and passing in proximity to the emergent nodal point of the lens of said projector, developing the resulting negative and photoengraving the line defined thereon.

2. The process of making a guide plate for use in producing solid reproductions of objects either in full or altered scale and in full or altered degree of relief which consists in throwing by means of a light projector a line on an object, photographing the line from such a position that there is recorded on the camera plate the apparent magnitude of displacement of the said line from its corresponding base line in a given plane of relief and reproducing in the form of a lineal guiding element the line as registered on the camera plate.

3. The process of making a guide plate for use in producing solid reproductions of objects either in full or altered scale and in full or altered degree of relief which consists in placing an object against a screen, throwing the image of a spiral on the object and a portion of the screen by means of a light projector so positioned that the optical axis of the projector lens is normal to the screen, photographing the line thus thrown by means of a camera so positioned that the optical axis of the camera lens is normal to the screen and the incident nodal point of the lens is approximately in a plane passing through the emergent nodal point optical center of the projector lens, and normal to the optical axis thereof, and forming in a plate a groove similar to the image of the said line as registered on the camera plate.

4. The process of making a guide plate for reproducing solid reproductions of objects either in full or altered scale and in full or altered degree of relief which consists in projecting a system of markings upon said surface and on a surface in the plane of relief, photographing said system of markings as thus projected whereby is obtained the orientation of points on said relief surface with reference to each other and with reference to the plane of relief, and etching in a plate of hard material the line defined on said photographic plate.

5. The process of making a guide plate for reproducing an object, which consists in projecting a system of markings upon an object to be reproduced and upon a surface in a given plane of relief, photographing said system of markings as thus projected, whereby is obtained the orientation of points in said object with reference to each other and with reference to said plane of relief, and photoengraving the photographic plate thus obtained on a plate of hard material.

6. The process of making a guide plate for reproducing objects, which consists in projecting a lineal design upon an object to be reproduced and upon a surface in a given plane of relief, photographing said lineal design as thus projected whereby is obtained on a plane surface the orientation of said lineal design with reference to its projection on said plane of relief, and engraving a plate of suitable material with a design similar to the design as thus photographed.

7. The process of making a guide plate for reproducing objects, which consists in projecting a lineal design upon an object to be reproduced and upon a surface in a given plane of relief, photograhing said lineal design as thus projected whereby is obtained on a plane surface the orientation of said lineal design with reference to its projection on said plane of relief, the emergent nodal point of the projector lens and the incident nodal point of the camera lens being approximately in a line parallel to said plane of relief when said design is photographed, and then preparing a plate of suitable material with a design similar to the design thus photographed.

8. The process of making a guide plate for use in producing solid reproductions of objects either in full or altered scale and in full or altered degree of relief which consists in optically projecting a system of markings upon the object and photographing of such object by a camera so positioned that the incident nodal point of the camera lens and the emergent nodal point of the projector lens lie in a plane approximately normal to the optical axis of the camera lens.

9. The process of making a guide plate for use in producing solid reproductions of objects either in full or altered scale and in full or altered degree of relief which consists in optically projecting a spiral upon the object and photographing of such object by a camera so positioned that incident nodal point of the camera lens and the emergent nodal point of the projector lens lie in a plane approximately normal to the optical axis of the camera lens.

10. The process of indicating in a plane the contour of a relief surface, which consists in photographing a visible line described on said relief surface from such a position that a measurable angular distance with respect to said position from each point in said line to the plane of relief may be registered on a camera plate.

11. The process of indicating in a plane the contour of a relief surface, which consists in photographing on a plate a visible line described on said relief surface from such a position that an apparent magnitude of the displacement of the said line from the plane of relief may be registered on said plate, whereby a contour line of said object is registered on said plate.

12. The process of indicating in a plane the contour of a relief surface, which consists in photographing on a plate a visible line described on said relief surface from such a position that an apparent magnitude of the displacement of the said line from the plane of relief may be registered on said plate, whereby a contour line of said object is registered on said plate, and then locating on said plate the position of the base line corresponding to said contour line.

13. The process of graphically representing in a plane the contour in partial relief, of a relief surface, which consists in defining on said relief surface a spiral, and photographing said spiral from such position that an apparent magnitude of the displacement of said spiral from a similar spiral in the plane of relief may be registered on the photographic plate.

14. The process of graphically representing in a plane the contour in partial relief, of a relief surface, which consists in defining on said relief surface a spiral, and photographing said spiral from such position that an apparent magnitude of the displacement of said spiral from a similar spiral in the plane of relief may be registered on the photographic plate and locating on said plate the corresponding position of said similar spiral.

15. The process of representing in a plane the contour of a relief surface, which consists in throwing an image of a spiral on said relief surface, and photographing said image from such position that an apparent magnitude of the displacement of said spiral from a similar spiral in the plane of relief may be registered on the photographic plate.

16. The process of representing in a plane the contour of a relief surface, which consists in throwing an image of a spiral on said relief surface, and photographing said image from such position that an apparent magnitude of the displacement of said spiral from a similar spiral in the plane of relief may be registered on the photographic plate and locating on said plate the corresponding position of said similar spiral.

17. The process of representing in a plane the contour of a relief surface which consists in throwing from a light projector a spiral on said relief surface, and photographing said spiral from such position that an apparent magnitude of the displacement of said spiral from a similar spiral in the plane of relief may be registered on the photographic plate.

18. The process of representing in a plane the contour of a relief surface, which consists of throwing a spiral on said surface by means of a projector having its optical axis normal to the plane of relief, and photographing said spiral by means of a camera so positioned that its optical axis is also normal to the said plane of relief whereby an apparent displacement of said spiral from said plane of relief is registered on the photographic plate.

19. The process of orienting on a plane points on the surface of an object with reference to a given plane of relief, which consists in projecting a known lineal design on said object and on a surface placed in said plane of relief, and then photographing said lineal design as thus projected by means of a camera the incident nodal point of the lens of which is located at a point not in a line of projection of any of said points.

20. The process of graphically representing in two dimensions the shape of a three dimensional figure which consists in projecting a known system of markings on said figure and then photographing said system of markings from a position not in the line of projection of any point in said system of markings.

21. The process of defining on a plane surface the relative position of points on the surface of an object with respect to a given plane of relief, which includes the photographing of a lineal design traversing said object by means of a camera placed in position to register an apparent magnitude of displacement of said points from said plane of relief.

22. The process of graphically representing on a plane the shape of a three dimensional figure which consists in projecting a known lineal design on said figure and on a surface in a given plane of relief, and then photographing said design as thus projected.

23. The process of making a graphical record on a plane surface of the shape of a solid object which consists in the optical projection of a system of markings upon the object and the photographing of such object by a camera so positioned that the incident nodal point of the camera lens and the emergent nodal point of the projector lens lie in a plane approximately normal to the optical axis of the camera lens.

24. The process of making a graphical record on a plane surface of the shape of a solid object which consists in the optical projection of a spiral upon the object and the photographing of such spiral by a camera so positioned that the incident nodal point of the camera lens and the emergent nodal point of the projector lens lie in a plane approximately normal to the optical axis of the camera lens.

25. A guide plate for use in reproducing relief surfaces, in which is inscribed a groove defining the contour of said relief surface with reference to a given line in the plane of relief.

26. A guide plate for use in reproducing relief surfaces in which is inscribed a groove defining the contour of said relief surface by a displacement from a given lineal design in a plane of relief.

27. In a guide plate for use in reproducing relief surfaces a plane surface provided with a lineal guiding element, said guiding element defining the contour of a relief surface with reference to and in projection from a line in the plane of relief of said relief surface.

28. A guide plate for use in reproducing relief surfaces comprising a plane surface provided with a lineal guide, said guide defining, with reference to a known or ascertainable line on said plate, the contour of a relief surface taken with reference to and substantially in projection from a line in the plane of relief of said relief surface.

29. A guide plate for use in reproducing objects in which is inscribed a groove defining the projection contour of said object with reference to a given plane of relief.

30. In a guide plate for use in reproducing objects, a hard surface provided with a lineal guiding element, said guiding element defining the projection contour of said object with reference to a given plane of relief.

31. In a record for use in producing a three dimensional figure, a surface provided with a lineal guiding element defining the contour of said figure with reference to a known lineal design in a given plane of relief.

32. A guide plate for use in reproducing relief surfaces, in which is inscribed a groove defining with reference to a known or ascertainable line on said plate, the contour of a relief surface taken with reference to and substantially in projection from a line in the plane of relief of said relief surface.

33. A guide plate for use in producing relief surfaces comprising a plate in which is inscribed a groove defining the contour of a given relief surface with reference to a base line on said plate, said base line corresponding to a similar base line in the plane of relief of the surface which is to be produced, and said contour being taken substantially in projection from said similar base line.

34. A guide plate for use in producing relief surfaces comprising a plate in which is inscribed a groove defining, with reference to a given line in said plate, the contour of a given relief surface in projection from a similar line in the plane of relief of said given relief surface.

35. A guide plate for use in producing relief surfaces comprising a plate in which is inscribed a groove each point in which is displaced from a point in the locus of a spiral on said plane a distance bearing a ratio to the elevation of a corresponding contour point on a given relief surface, the said ratio being constant for all elevations, and the directions of displacement being parallel to each other.

36. A guide plate for use in producing relief surfaces comprising a plate provided with a lineal guiding element defining in partial relief the contour of a relief surface in projection from a given line in the plane of relief, the contour as defined by said guiding element on said plate being with reference to the locus of a known line thereon.

37. A guide plate for use in producing relief surfaces comprising a plate in which is inscribed a groove defining, with reference to the locus of a spiral on said plate, the contour of a given relief surface in projection from a similar spiral in the plane of relief of said given relief surface.

38. A guide plate for use in producing relief surfaces comprising a plate in which is inscribed a groove defining, with reference to the locus of a spiral on said plate, the contour of a given relief surface in projection from a similar spiral in the plane of relief of said given relief surface, each point in said groove being displaced from said locus in the plane thereof; and the direction of displacement of all of said points being parallel.

39. A guide plate for use in reproducing objects in which is inscribed a groove determining with reference to the locus of a known line thereon, the orientation of points on the surface of an object with reference to each other and with reference to a given plane of relief of said object.

40. A guide plate for use in reproducing a given object in partial or full relief which consists of a plane surface in which is inscribed a groove representing with respect to a given lineal design on said plate an apparent displacement in a given plane of relief of said object of a similar design projected on said object.

41. A guide plate for use in reproducing the surface of a three dimensional figure which consists of a cam defining the relative positions of points on the surface of said figure with respect to a given plane of relief.

42. A guide plate for use in reproducing the surface of a three dimensional figure which consists of a path cam defining the relative position of points on the surface of said figure with respect to a given plane of relief.

43. A complement of guide plates for use in reproducing a given object in partial or full relief each of which consists of a plane surface in which is inscribed a groove representing with respect to a given lineal design on said plate an apparent lateral displacement in a given plane of relief of said object of a similar design projected on said object, said displacements being in different directions.

44. A plate on which is described a line defining the projection contour of a relief surface with reference to a given line in the plane of relief of said relief surface.

45. A plate on which is described a line defining the contour of a relief surface in projection from a given line in the plane of relief, the contour as defined by said line on said plate being with reference to the locus of another known line thereon.

46. A plate on which is described a line representing the contour of a relief surface in projection from the locus of a known line.

47. A plate for use in the production of a given three dimensional figure on which is defined a series of points which are removed respectively from points in the locus of a known line on said plate distances bearing a constant ratio to the distances of corresponding points on the surface of said figure from the projection of said last mentioned points on a given plane of relief of said figure, the said distances on said plate all being measured in directions parallel with each other.

48. The process of graphically representing in two dimensions the shape of a three dimensional figure which consists in projecting a spiral on said figure, and then photographing said spiral.

49. The process of graphically representing in two dimensions the shape of a three dimensional figure which consists in projecting a spiral on said figure and then photographing said spiral from a point not in the line of projection.

50. The process of graphically representing on a plane the shape of a three dimensional figure which consists in projecting a spiral on said figure and on a surface in a given plane of relief, and then photographing said spiral.

51. The process of graphically representing on a plane the shape of a three dimensional figure which consists in projecting a spiral on said figure by means of a lantern located with the optical axis of the lens normal to a given plane of relief, and then photographing said spiral by means of a camera positioned with the optical axis of its lens also normal to said plane of relief.

52. The process of graphically representing on a plane the shape of a three dimensional figure which consists in projecting a spiral on said figure by means of a lantern located with the optical axis of the lens normal to a given plane of relief, and then photographing said spiral, by means of a camera positioned with the optical axis of its lens also normal to said plane of relief, the incident nodal point of the camera lens and the emergent nodal point of the lantern lens being in a plane approximately parallel to said plane of relief.

53. The process of graphically representing on a plane the shape of a three dimensional figure which consists in optically projecting a spiral on said figure and photographing said spiral with a camera so positioned that the image of said spiral on a plane placed normally to the optical axis of said camera lens would appear undistorted and the incident nodal point of the camera lens and the emergent nodal point of the projector lens lying in a plane approximately normal to the optical axis of the camera lens.

54. In an apparatus for making two dimensional records of three dimensional surfaces, an optical projector, a screen and a plurality of cameras, the axis of said projector lens being normal to the screen, and the emergent nodal point of the projector lens and incident nodal point of the camera lens being in a plane approximately parallel to said screen.

55. In an apparatus for making two dimensional records of three dimensional surfaces, an optical projector, a screen and a plurality of cameras, the axes of the lenses of said projector and cameras all being normal to said screen and the incident nodal points of the camera lenses and emergent nodal point of the projector lens all being in a plane approximately parallel to said screen.

56. In an apparatus for making two dimensional records of three dimensional surfaces, an optical projector, a transparency for said optical projector having thereon the image of a system of markings, a camera, and a screen, the projector camera and screen being so positioned with relation to each other that the optical axis of the projector lens is normal to the screen, and the emergent nodal point of the projector lens and the incident nodal points of the camera lenses are in a line approximately parallel to said screen.

57. In an apparatus for making two dimensional records of three dimensional surfaces, a camera, an optical projector and a screen, positioned with relation to each other so that the optical axis of the projector lens is normal to the screen, and the incident nodal point of the camera lens and the emergent nodal point of the projector lens are in a line approximately parallel to said screen.

58. In an apparatus for making two dimensional records of three dimensional surfaces, a camera, an optical projector and a screen, positioned with relation to each other so that the optical axes of the lenses of said camera and projector are both normal to the screen and the incident nodal point of the camera lens and the emergent nodal point of the projector lens are in a line approximately parallel to said screen.

59. In an apparatus for making two dimensional records of three dimensional surfaces, a camera, an optical projector and a screen, positioned with relation to each other so that the optical axis of either said camera lens or said projector lens is normal to the screen, and the incident nodal point of the camera lens and the emergent nodal point of the projector lens are in a line approximately parallel to said screen.

60. In an apparatus for making two dimensional records of three dimensional surfaces, an optical projector, a transparency for said optical projector having thereon the image of a system of markings, a camera, and a screen, the projector camera and screen being so positioned with relation to each other that the optical axes of the projector and camera lenses are normal to the screen and the emergent nodal point of the projector lens and the incident nodal point of the camera lens are in a line approximately parallel to said screen.

61. In an apparatus for making two dimensional records of three dimensional surfaces, an optical projector, a transparency for said optical projector having thereon the image of a lineal design, a camera, and a screen, the projector camera and screen being so positioned with relation to each other that the optical axis of the projector lens is normal to the screen, and the emergent nodal point of the projector lens and the incident nodal point of the camera lens are in a line approximately parallel to said screen.

62. In an apparatus for making two dimensional records of three dimensional surfaces, an optical projector, a transparency for said optical projector having thereon the image of a lineal design, a camera, and a screen, the projector camera and screen being so positioned with relation to each other that the optical axes of the projector and camera lenses are normal to the screen and the emergent nodal point of the projector lens and the incident nodal point of the camera lens are in a line approximately parallel to said screen.

63. In an apparatus for making two dimensional records of three dimensional surfaces, an optical projector, a transparency for said optical projector having thereon the image of a spiral, a camera, and a screen, the projector camera and screen being so positioned with relation to each other that the optical axis of the projector lens is normal to the screen, and the emergent nodal point of the projector lens and the incident nodal point of the camera lens are in a line approximately parallel to said screen.

64. In an apparatus for making two dimensional records of three dimensional surfaces, an optical projector, a transparency for said optical projector having thereon the image of a spiral, a camera, and a screen, the projector camera and screen being so positioned with relation to each other that the optical axes of the projector and camera lenses are normal to the screen and the emergent nodal point of the projector lens and the incident nodal point of the camera lens are in a line approximately parallel to said screen.

65. The process of making a guide plate for use in producing solid reproductions of objects either to full or altered scale or in full or altered degree of relief which consists in the optical projection on the object of a system of markings and the photographing of such object by a camera so positioned that those nodal points of the lenses of projector and camera which are located nearest the object both lie approximately in that nodal plane of one of said lenses which is nearest the said object.

66. The process of making a guide plate for use in producing solid reproductions of objects either to full or altered scale or in full or altered degree of relief which consists in the optical projection upon the object of a spiral and the photographing of such object by a camera so positioned that those nodal points of the lenses of projector and camera which are located nearest the object both lie approximately in that nodal plane of one of said lenses which is nearest the said object.

67. The process of making a graphical record on a plane surface of the shape of a solid object which consists in the optical projection upon the object of a system of markings and the photographing of such object by a camera so positioned that the emergent nodal point of the projector lens and the incident nodal point of the camera lens both lie in a plane approximately normal to the optical axis of one of them.

68. The process of making a graphical record on a plane surface of the shape of a solid object which consists in the optical projection upon the object of a spiral and the photographing of such spiral by a camera so positioned that the emergent nodal point of the projector and the incident nodal point of the camera both lie in a plane approximately normal to the optical axis of one of them.

69. In an apparatus for making two dimensional records of three dimensional surfaces, an optical projector provided with a transparency on which is defined a system of markings, and a camera, the incident nodal point of the lens of the camera being the emergent nodal plane of the projector.

70. In an apparatus for making two dimensional records of three dimensional surfaces, an optical projector provided with a transparency on which is defined a system of markings, and a plurality of cameras, the incident nodal points of the lenses of the cameras being approximately in the emergent nodal plane of the projector.

71. In an apparatus for making two dimensional records of three dimensional surfaces, an optical projector provided with a transparency on which is defined a spiral, and a camera, the incident nodal point of the lens of which is approximately in the emergent nodal plane of the lens of the projector.

72. In an apparatus for making two dimensional records of three dimensional surfaces an optical projector and a plurality of cameras, the axis of the lens of said projector being normal to the screen and the emergent nodal point of the projector lens and the incident nodal points of the camera lenses being in a plane parallel to the plane of relief.

73. In an apparatus for making two dimensional records of three dimensional surfaces an optical projector and a plurality of cameras, the axes of the lenses of said projector and cameras all being normal to the plane of relief and the incident nodal points of the camera lenses and the emergent nodal point of the projector lens being in a plane parallel to said plane.

74. In an apparatus for making two dimensional records of three dimensional surfaces an optical projector, a transparency for said optical projector having thereon a system of markings and a camera, the projector and camera being so positioned with relation to each other that the optical axis of the projector lens is normal to the plane of relief and the emergent nodal point of the projector lens and the incident nodal point of the camera lens are in a line parallel to said plane.

75. In an apparatus for making two dimensional records of three dimensional surfaces, a camera and an optical projector so positioned with relation to each other that the optical axis of the projector lens is normal to the plane of relief, and the incident nodal point of the camera lens and the emergent nodal point of the projector lens are in a line parallel to said plane.

76. In an apparatus for making two dimensional records of three dimensional surfaces, a camera and an optical projector so positioned with relation to each other that the optical axis of either said camera lens or said projector lens is normal to the plane of relief, and the incident nodal point of the camera lens and the emergent nodal point of the projector lens are in a line parallel to said plane.

77. In an apparatus for making two dimensional records of three dimensional surfaces, an optical projector, a transparency for said optical projector having thereon the image of a system of markings, and a camera, the projector and the camera being so positioned with relation to each other that the optical axes of the projector and camera lenses are normal to the plane of relief and the emergent nodal point of the projector lens and the incident nodal point of the camera lens are in a line parallel to said plane.

In testimony whereof, I have signed this specification.

HOWARD M. EDMUNDS.